(12) United States Patent
Kim et al.

(10) Patent No.: US 8,942,105 B2
(45) Date of Patent: Jan. 27, 2015

(54) METHOD FOR PROCESSING TRAFFIC IN AN INTERMEDIATE ACCESS POINT

(75) Inventors: Byoung Hoon Kim, Anyang-si (KR); Seo Woo Jang, Anyang-si (KR); Jae Won Lim, Anyang-si (KR); Jun Ho Jo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 657 days.

(21) Appl. No.: 13/264,987

(22) PCT Filed: Jul. 28, 2009

(86) PCT No.: PCT/KR2009/004185
§ 371 (c)(1),
(2), (4) Date: Dec. 22, 2011

(87) PCT Pub. No.: WO2010/120014
PCT Pub. Date: Oct. 21, 2010

(65) Prior Publication Data
US 2012/0087246 A1   Apr. 12, 2012

Related U.S. Application Data

(60) Provisional application No. 61/169,729, filed on Apr. 16, 2009.

(51) Int. Cl.
*H04L 12/26* (2006.01)
*H04J 1/10* (2006.01)
*H04B 7/15* (2006.01)
*H04W 28/08* (2009.01)
*H04B 7/26* (2006.01)
*H04W 84/04* (2009.01)

(52) U.S. Cl.
CPC ............. *H04W 28/08* (2013.01); *H04B 7/2606* (2013.01); *H04W 84/045* (2013.01); *H04W 84/047* (2013.01)

USPC ............. 370/237; 370/492; 455/11.1; 455/15

(58) Field of Classification Search
None
See application file for complete search history.

(56) References Cited

U.S. PATENT DOCUMENTS

| | | | |
|---|---|---|---|
| 2005/0100029 A1* | 5/2005 | Das ............................ | 370/401 |
| 2005/0141593 A1* | 6/2005 | Pasanen et al. ............... | 375/130 |

(Continued)

FOREIGN PATENT DOCUMENTS

KR   1020090015543   2/2009

OTHER PUBLICATIONS

U.S. Appl. No. 13/264,985 Office Action dated Sep. 12, 2013, 10 pages.

*Primary Examiner* — Yemane Mesfin
*Assistant Examiner* — Peter Chen
(74) *Attorney, Agent, or Firm* — Lee, Hong, Degerman, Kang & Waimey (57) ABSTRACT

A method for processing traffic destined for a BS received from one or more terminals in an intermediate access point supporting two or more communication schemes is disclosed. The method includes receiving traffic from the one or more terminals according to a first communication scheme, measuring a congestion level of the received traffic, transmitting a first traffic being part of the received traffic to a second intermediate access point according to a second communication scheme, if the congestion level is a predetermined threshold or higher, and transmitting a second traffic being remaining traffic of the received traffic except the first traffic to the BS.

12 Claims, 11 Drawing Sheets

(56) References Cited

U.S. PATENT DOCUMENTS

| | | |
|---|---|---|
| 2005/0237973 A1 | 10/2005 | Takeda et al. |
| 2007/0223377 A1* | 9/2007 | de Heer ..................... 370/235 |
| 2008/0045204 A1 | 2/2008 | Takano et al. |
| 2008/0056125 A1 | 3/2008 | Kneckt et al. |
| 2008/0107075 A1 | 5/2008 | Ramachandran et al. |
| 2008/0137581 A1* | 6/2008 | Doppler et al. ............... 370/315 |
| 2008/0181318 A1 | 7/2008 | Kim et al. |
| 2008/0212542 A1* | 9/2008 | Kung et al. .................. 370/336 |
| 2008/0225829 A1 | 9/2008 | Sachs et al. |
| 2011/0189944 A1 | 8/2011 | Wang et al. |
| 2012/0184222 A1 | 7/2012 | Seok |

* cited by examiner

METHOD FOR PROCESSING TRAFFIC IN AN INTERMEDIATE ACCESS POINT

CROSS-REFERENCE TO RELATED APPLICATIONS

This application is a the National Stage filing under 35 U.S.C. 371 of International Application No. PCT/KR2009/004185, filed on Jul. 28, 2009, which claims the benefit of U.S. Provisional Application Ser. No. 61/169,729, filed on Apr. 16, 2009, the contents of which are hereby incorporated by reference herein in their entirety.

TECHNICAL FIELD

The present invention relates to a method for efficiently processing traffic in an intermediate access point such as a Relay Station (RS).

BACKGROUND ART

Discussion about adding an intermediate access point between a Base Station (BS) and a terminal is underway in mobile communication systems. The intermediate access point may include an RS, a femto cell, a pico cell, etc. The following description is made with the appreciation that the intermediate access point is an RS, by way of example.

Figure 1:
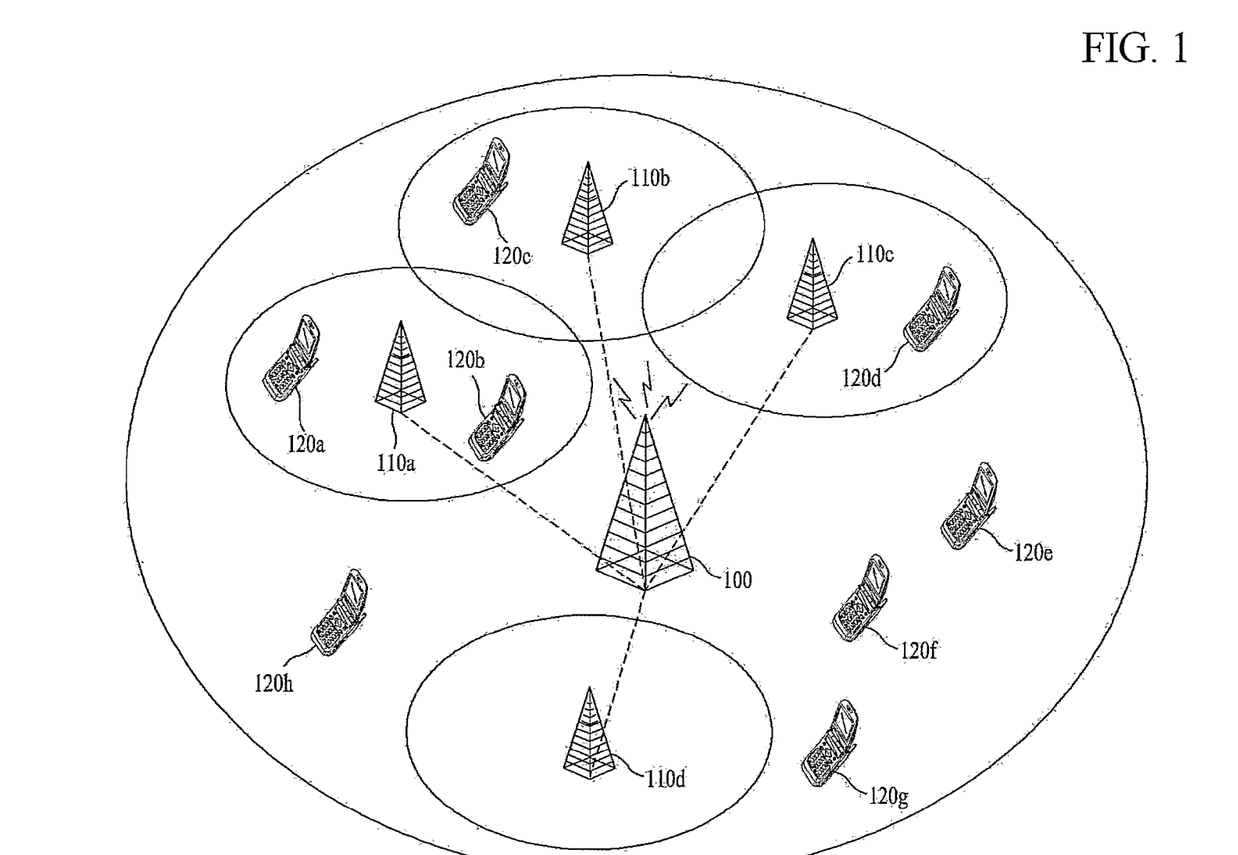
FIG. 1 conceptually illustrates the configuration of a communication system using RSs.

FIG. 1 conceptually illustrates the configuration of a communication system using RSs.

Referring to FIG. 1, a BS 100 is connected to a plurality of RSs 110a to 110d by cable and the RSs 110a to 110d provide communication services to terminals 120a to 120h within their coverage areas. For example, the RS 110a may relay a signal received from the terminal 120a to the BS 100 and a signal received from the BS 100 to the terminal 120a.

As described above, an intermediate access point such as an RS, interposed between a BS and a terminal receives a signal from the BS or the terminal, amplifies or actively processes the received signal, and transmits the amplified or actively processed signal to the terminal or the BS, thereby extending communication service coverage. Also, the intermediate access point enhances throughput by improving communication services between the BS and the terminal.

Under circumstances, traffic between terminals and the BS may be congested at a particular intermediate access point. In this case, there exists a need for developing a method for efficiently processing traffic.

DISCLOSURE

Technical Problem

An object of the present invention devised to solve the problem lies on a method for efficiently processing traffic, when traffic between a BS and terminals are congested at a particular intermediate access point, and an intermediate access point apparatus for the same.

Technical Solution

The object of the present invention can be achieved by providing a method for processing traffic destined for a BS received from one or more terminals in an intermediate access point supporting two or more communication schemes, the method including receiving traffic from the one or more terminals according to a first communication scheme, measuring a congestion level of the received traffic, transmitting a first traffic being part of the received traffic to a second intermediate access point according to a second communication scheme, if the congestion level is a predetermined threshold or higher, and transmitting a second traffic being remaining traffic of the received traffic except the first traffic to the BS.

The first and second communication schemes may be independent of each other.

The first communication scheme may be a cellular communication scheme and the second communication scheme may be a WLAN communication scheme.

Each of the intermediate access points may be an RS. In this case, the second traffic may be transmitted over a wired network connected between the RS and the BS.

Each of the intermediate access points may be a femto BS or a pico BS.

The congestion level of the received traffic may be determined based on a queue length of a link between the BS and the intermediate access point.

If the congestion level is the predetermined threshold or higher, traffic having a delay sensitiveness below a predetermined value may be selected as the first traffic from among the received traffic and transmitted to the second intermediate access point, and traffic having a delay sensitiveness equal to or higher than the predetermined value may be selected as the second traffic from among the received traffic and transmitted to the BS.

In another aspect of the present invention, provided herein is an intermediate access point apparatus supporting two or more communication schemes, including a first communication module for receiving traffic from one or more terminals according to a first communication scheme, a second communication module for transmitting traffic to a second intermediate access point apparatus according to a second communication scheme, a third communication module for transmitting traffic to a BS according to a third communication scheme, and a processor for measuring a congestion level of the traffic received at the first communication module, and if the congestion level is a predetermined threshold or higher, controlling a first traffic being part of the traffic received at the first communication module to be transmitted to the second intermediate access point through the second communication module and a second traffic being remaining traffic of the traffic received at the first communication module except the first traffic to be transmitted to the BS through the third communication module.

The first and second communication schemes may be independent of each other.

The first communication module may be a cellular communication module and the second communication module may be a WLAN communication module.

Each of the intermediate access point apparatuses may be an RS. In this case, the third communication module may be a wired communication module using a wired network connected between the RS and the BS.

Each of the intermediate access point apparatuses may be a femto BS or a pico BS.

The processor may determine the congestion level of the received traffic based on a queue length of a link between the BS and the intermediate access point apparatus. The first traffic may be traffic having a delay sensitiveness below a predetermined value among the traffic received from the one or more terminals and the second traffic may be traffic having a delay sensitiveness equal to or higher than the predetermined value among the traffic received from the one or more terminals.

Advantageous Effects

According to exemplary embodiments of the present invention, in spite of traffic between a BS and terminals congested at a particular intermediate access point, the traffic is efficiently processed without a long time delay. When a path is established, taking into account the characteristics of the traffic, communication quality is further improved.

Compared to an inter-Radio Access Technology (RAT) handover technology in which inter-RAT handover occurs in case of traffic congestion, the exemplary embodiments of the present invention save the time taken for a terminal's inter-RAT handover, minimize system modification, and efficiently process traffic.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "terminal" generically refers to a mobile or fixed user terminal device such as a User Equipment (UE), a Mobile Station (MS), etc. Also, an intermediate access point may include an RS, a femto BS, a pico BS, a Home Node B (HNB), an enhanced HNB (eHNB), etc.

An exemplary embodiment of the present invention is intended to provide a method for efficiently processing traffic, when traffic between a BS and terminals is congested at a particular intermediate access point. Before describing the exemplary embodiment of the present invention, a detailed description will first be made of an RS under discussion as an example of an intermediate access point added between a BS and a terminal in Institute of Electrical and Electronics Engineers (IEEE) 802.16. Notably, the same description of an RS considered in IEEE 802.16j may be applicable to an RS under consideration in 3rd Generation Partnership Project International Mobile Telecommunications-Advanced (3GPP IMT-Advanced, e.g. Long Term Evolution-Advanced (LTE-A)). Also, the following description of an RS is applicable to other types of intermediate access points.

In 2006, IEEE 802.16 was working on a new project of standardizing multi-hop relay, after publishing a standard for fixed subscription stations, IEEE 802.16-2004 and a standard for providing mobility to subscriber stations, IEEE 802.16e-2005. Task Group j of IEEE 802.16 also called IEEE 802.16TGj, which takes charge of this project, started to seriously discuss usage model, terminology, and technical requirements in the second meeting on July, 2006 after the first official meeting on May, 2006. Hereinbelow, IEEE 802.16j is short for IEEE 802.16TGj.

The following two goals are clarified for a standardization task under IEEE 802.16j Project Authorization Request (PAR).

(1) Coverage extension
(2) Throughput enhancement

Figure 2:
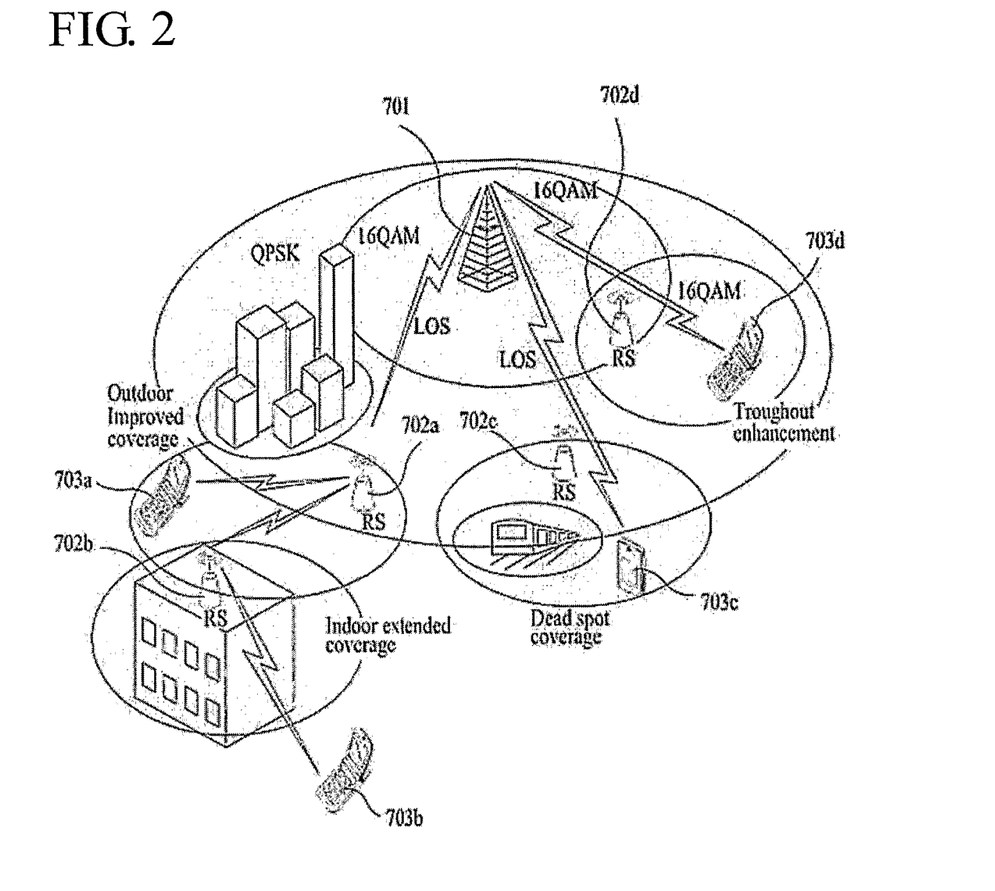
FIG. 2 is a schematic view illustrating a function of an RS to which an exemplary embodiment of the present invention is applicable.

FIG. 2 is a schematic view illustrating a function of an RS to which an exemplary embodiment of the present invention is applicable.

Referring to FIG. 2, reference numeral 701 denotes a BS, reference numerals 702a to 702d denote RSs, and reference numerals 703a to 703d denote terminals. As illustrated in FIG. 2, terminals can communicate with the BS 701 even outside the coverage area of the BS 701 or in a shadowing area via the RSs 702a, 702b and 702c. To be more specific, the outdoor coverage of the BS 701 is extended through the RS 702a, the indoor coverage of the BS 701 is extended through the RS 702b, and the BS 701 can provide communication services through the RS 702c even to a shadowing area where communication services are blocked due to a high-speed railway or the like.

Further, because a high-quality path to which a high-order Adaptive Modulation and Coding (AMC) is applicable can be established with the terminal 703d within the coverage area of the BS 701 through the RS 702d, system capacity can be increased with the same amount of radio resources.

Figure 3:
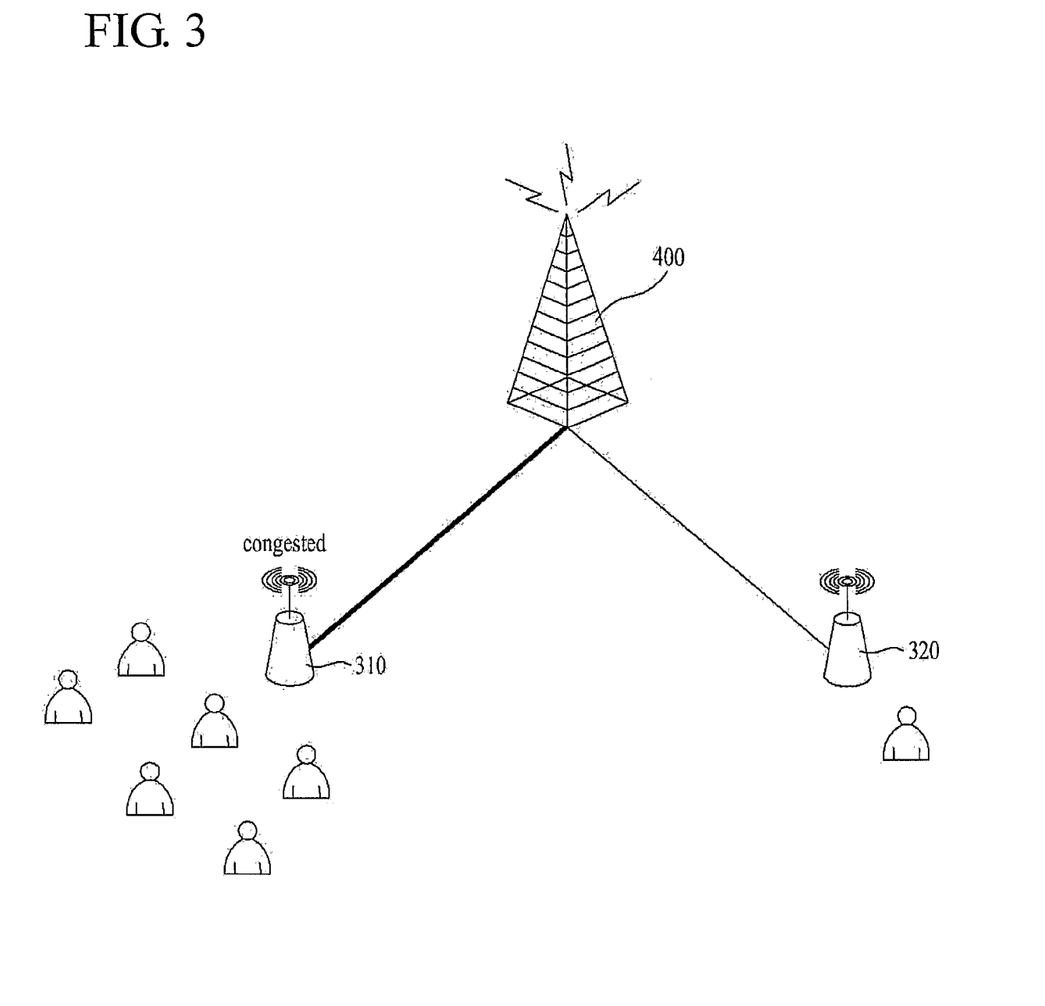
FIG. 3 illustrates a case of traffic congestion at a particular RS.

Meanwhile, it may occur that traffic is congested at a certain RS. FIG. 3 illustrates a case of traffic congestion at a particular RS.

Referring to FIG. 3, when traffic is congested at a particular RS 310, there may be problems with processing traffic sensitive to delay or jitter. The present invention is based on the property that a neighbor RS 320 may have extra capacity for processing traffic in case of traffic congestion at the RS 310. That is, part of the traffic congested at the RS 310 is transmitted to the neighbor RS 320 in an independent communication scheme to thereby prevent delay- or jitter-caused performance degradation in an exemplary embodiment of the present invention.

Figure 4:
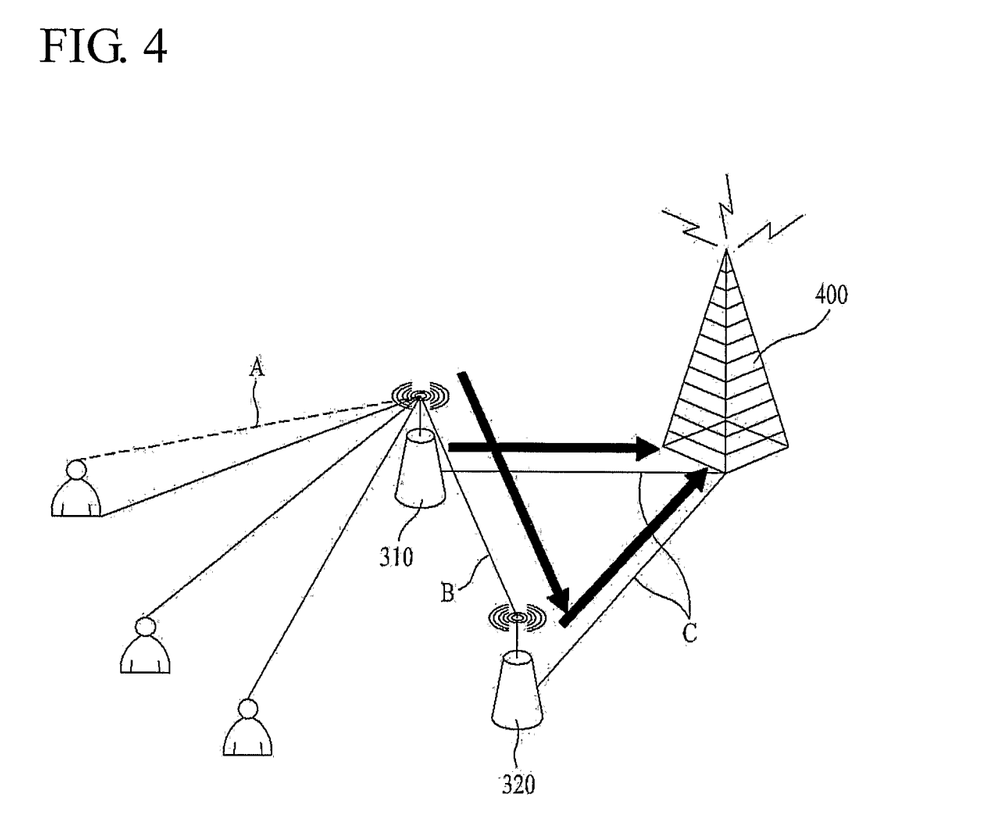
FIG. 4 illustrates the concept of distributing and processing traffic to a neighbor intermediate access point, when user traffic is congested at a particular intermediate access point according to an exemplary embodiment of the present invention.

FIG. 4 illustrates the concept of distributing and processing traffic to a neighbor intermediate access point, when user traffic is congested at a particular intermediate access point according to an exemplary embodiment of the present invention.

Referring to FIG. 4, when an intermediate access point, for example, the RS 310 receives traffic from a terminal in a first communication scheme A and relays the traffic to a BS 400, traffic may be congested at the RS 310, thus causing delay and jitter, as described above. In this context, the RS 310 measures the level of the traffic congestion and if the traffic congestion level is a predetermined value or higher, it transmits part of the user traffic to the neighbor RS 320 in a second communication scheme B so that the neighbor RS 320 may transmit the received traffic to the BS 400 in accordance with the exemplary embodiment of the present invention. Preferably, the first and second communication schemes A and B are different schemes independent of each other. The exemplary embodiment of the present invention is implemented on the assumption that RSs are Wireless Local Area Network (WLAN) enabled and is implemented such that the RS 310 transmits part of user traffic received according to a cellular communication scheme to the neighbor RS 320 according to a WLAN communication scheme, and the neighbor RS 320 transmits the received traffic to the BS 400 via a wired connection C. In the mean time, the RS 310 may transmit traffic received users other than the traffic transmitted to the neighbor RS 320 to the BS 400 via a wired connection C established with the BS 400.

One thing to note herein is that an intermediate access point may include a femto BS, a pico BS, etc. and the connection between the intermediate access point and a BS depends on the type of the intermediate access point. For example, when the intermediate access point is a femto BS, traffic may be transmitted between the femto BS and the BS 400 via a wireless connection.

Now a description will be made of an exemplary embodiment of the present invention using WLAN-enabled RSs.

Figure 5:
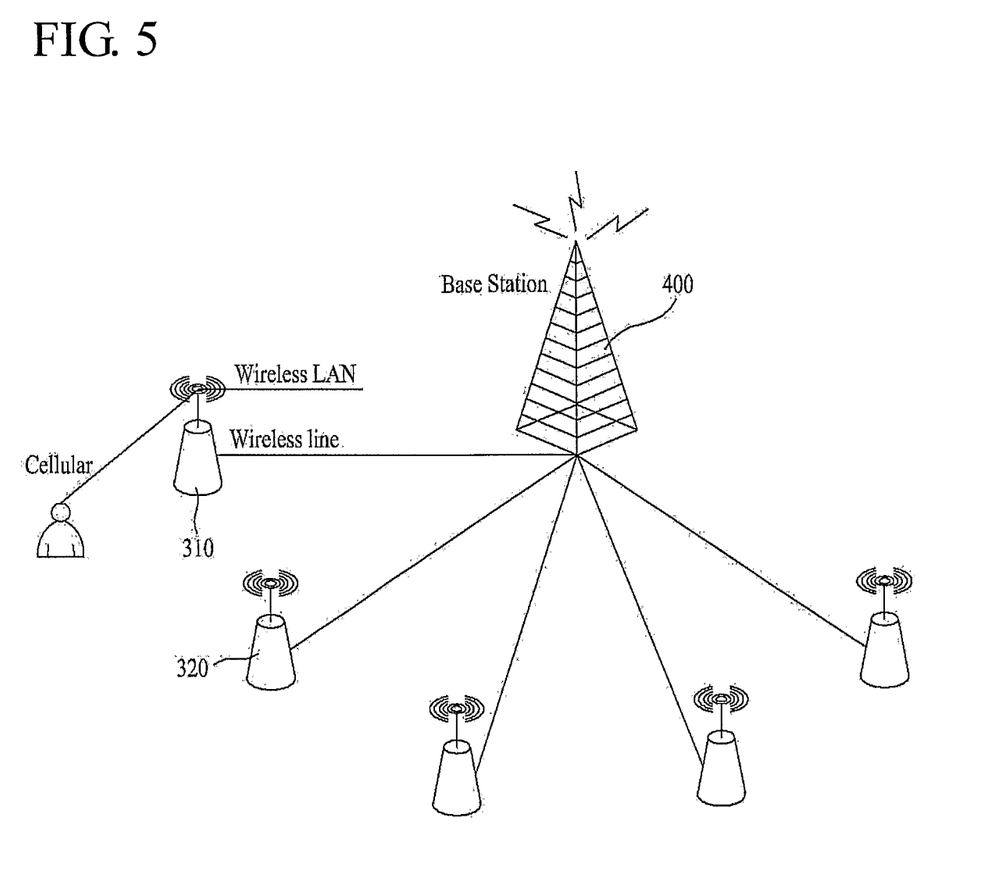
FIGS. 5 and 6 illustrate a method for processing traffic in a distributed manner using WLAN-enabled RSs according to an exemplary embodiment of the present invention.
Figure 6:
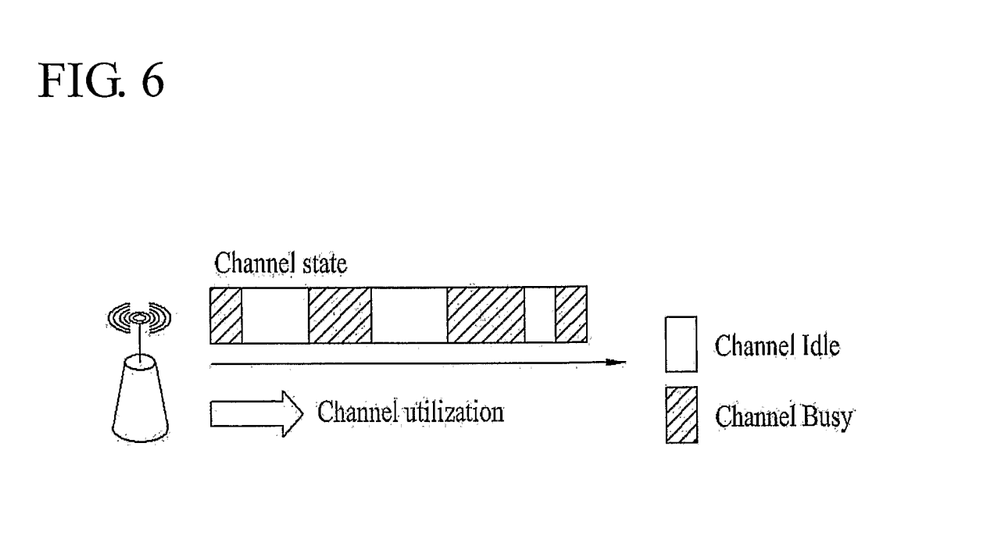

FIGS. 5 and 6 illustrate a method for processing traffic in a distributed manner using WLAN-enabled RSs according to an exemplary embodiment of the present invention.

The exemplary embodiment of the present invention is implemented on the assumption that a plurality of RSs are under control of a single BS, more or less close to one another in a cellular environment, as illustrated in FIG. 5.

It is assumed that each RS is connected to the BS by cable and to users in a wireless cellular fashion and is WLAN-enabled because it is equipped with a WLAN interface card.

As stated above, each RS has a WLAN card in the exemplary embodiment of the present invention. Implementation of the exemplary embodiment of the present invention may offer the benefits of decreased RS complexity and/or use of low-price WLAN cards. When its neighbor WLAN devices are not in communications, an RS may perform a variety of operations in WLAN. Since WLAN communications are made using independent cards, they may occur simultaneously with wired communications or wireless cellular communications.

WLAN is based on Carrier Sense Multiple Access with Collision Avoidance (CSMA/CA). CSMA/CA is an access control scheme used for WLAN, in which each terminal transmits data only after confirming that a communication line is kept clear for a predetermined time or longer because no collision (e.g. collision between signals on the same link) is detectable in WLAN. Therefore, a current channel status is known by Clear Channel Assessment (CCA) in WLAN. FIG. 6 illustrates an operation for monitoring channel status for channel utilization in an RS according to an exemplary embodiment of the present invention.

In the exemplary embodiment of the present invention, the RS calculates the rate of a time during which other WLAN devices occupy a channel to a predetermined total time based on a channel monitoring result and estimates the channel status of WLAN based on the ratio. As a channel has a lower use rate, it is better and has a higher utility for cooperative communications between RSs according to the exemplary embodiment of the present invention. On the contrary, a channel with a higher use ratio has a lower utility for cooperative communications between RSs according to the exemplary embodiment of the present invention.

The distributed traffic processing based on a calculated traffic congestion level according to the exemplary embodiment of the present invention will be described below in great detail.

Figure 7:
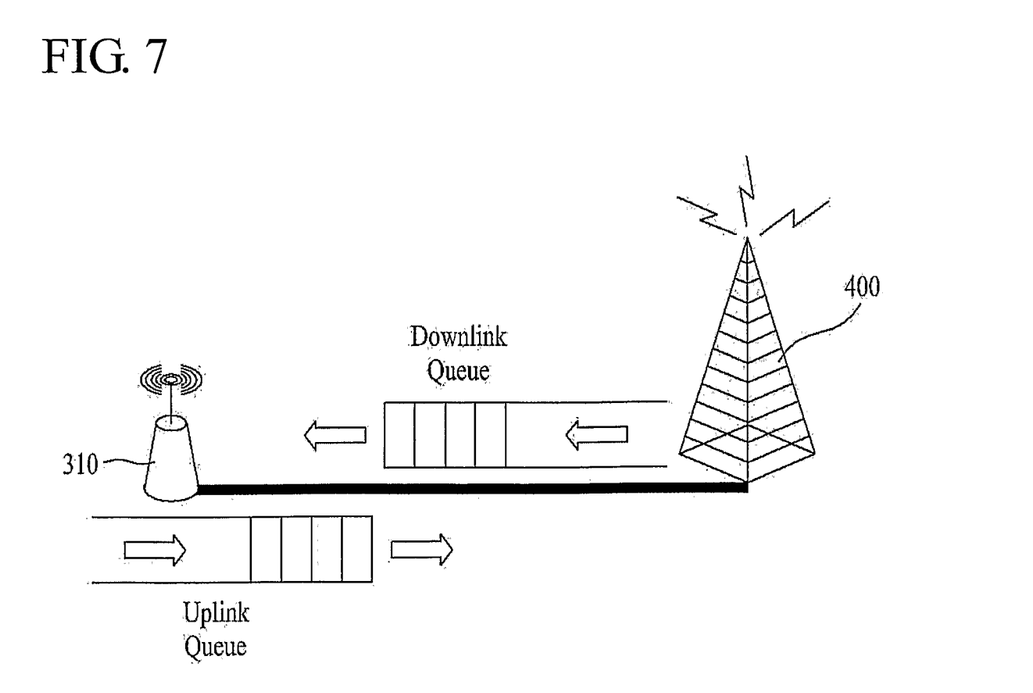
FIG. 7 illustrates a method for determining a traffic congestion level according to an exemplary embodiment of the present invention.

FIG. 7 illustrates a method for determining a traffic congestion level according to an exemplary embodiment of the present invention.

Referring to FIG. 7, the RS 310 transmits traffic received from a user to the BS 400 over a wired network. In the exemplary embodiment of the present invention, the RS 310 may determine the congestion level of the wired network based on a queue length of a link. That is, the RS 310 may determine the congestion level by calculating the amount of data buffered in a buffer before transmitting the received user traffic to the BS 400.

Because more queued data leads to a long delay of user traffic, it may adversely affect users with delay-sensitive Quality of Service (QoS). An estimated delay time may be mathematically calculated based on a queue length by a queueing theory. It is preferable to get knowledge of a downlink queue length as well as an uplink queue length. To this end, the RS 310 preferably exchanges information about queue lengths continuously.

Figure 8:
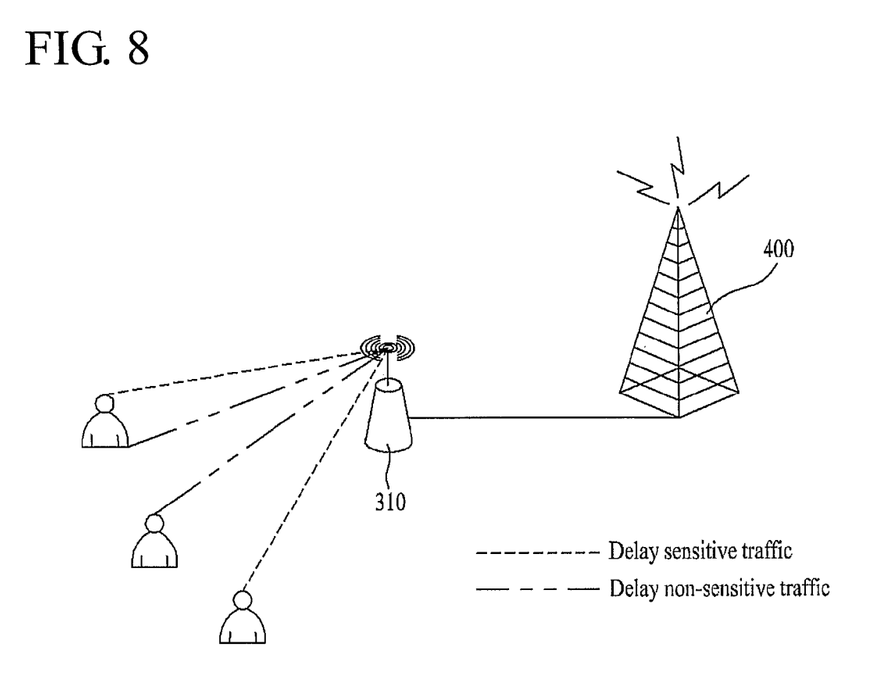
FIG. 8 illustrates selection of traffic to be transmitted to another RS, when an RS transmits part of user traffic to another RS, for distributed processing according an exemplary embodiment of the present invention.

FIG. 8 illustrates selection of traffic to be transmitted to another RS, when an RS transmits part of user traffic to another RS, for distributed processing according an exemplary embodiment of the present invention.

Referring to FIG. 8, the RS 310 preferably distinguishes user traffic according to their QoS requirements. That is, the RS 310 determines whether a user-required QoS can be satisfied at a current congestion level of the wired network and sets a criterion on whether to distribute user traffic to another RS based on the determination in the exemplary embodiment of the present invention.

As illustrated in FIG. 8, user traffic may be delay-sensitive or delay-tolerant. Although a decision as to whether to transmit traffic to a neighbor RS may be made according to the congestion level of the wired network and the delay sensitiveness of the traffic, it is preferred that the RS 310 distributes delay-tolerant traffic to the neighbor BS and transmits delay-sensitive traffic directly to the BS 400 over the wired network.

Now a description will be made of a method for detecting a helping RS for helping with traffic processing, when traffic is congested at a particular RS.

Figure 9:
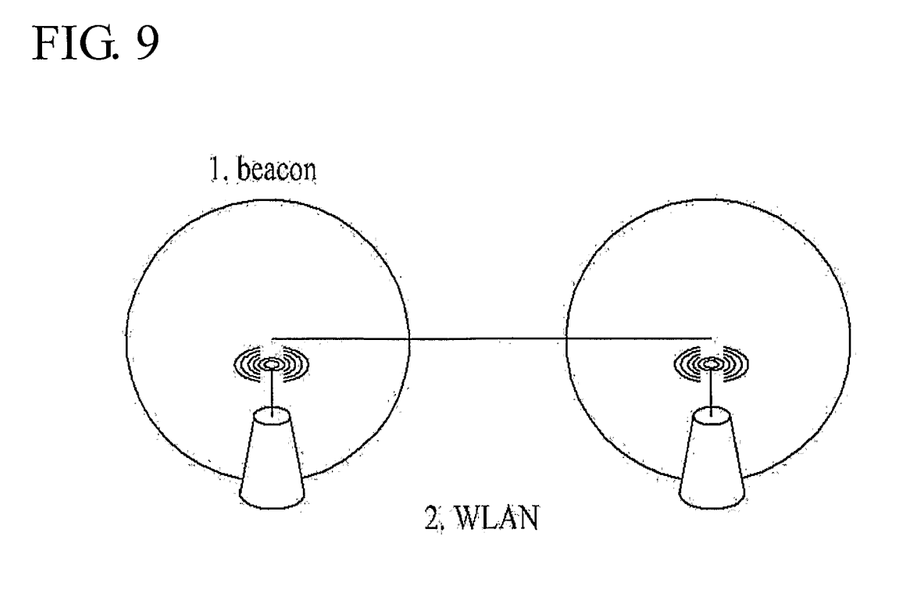
FIG. 9 illustrates a method for autonomously detecting a helping RS in an RS according to an exemplary embodiment of the present invention.

FIG. 9 illustrates a method for autonomously detecting a helping RS in an RS according to an exemplary embodiment of the present invention.

Referring to FIG. 9, each RS may broadcast a beacon message indicating its presence periodically like a WLAN access point. Therefore, RSs may be aware that other RSs exist near to them by receiving beacon messages from the neighbor RSs in the exemplary embodiment of the present invention. When an RS needs to establish a WLAN path, it may connect to a neighbor BS as if it were a WLAN user, for communications.

The exemplary embodiment of the present invention is advantageously implementable simply by modifying RSs without the aid of another network and conducts communications, reflecting use statuses of neighbor WLAN devices. Further, the exemplary embodiment of the present invention shortens a time required to open a WLAN session. However, due to difficulty in acquiring traffic information about a helping RS, the detected helping RS may not be idle.

Figure 10:
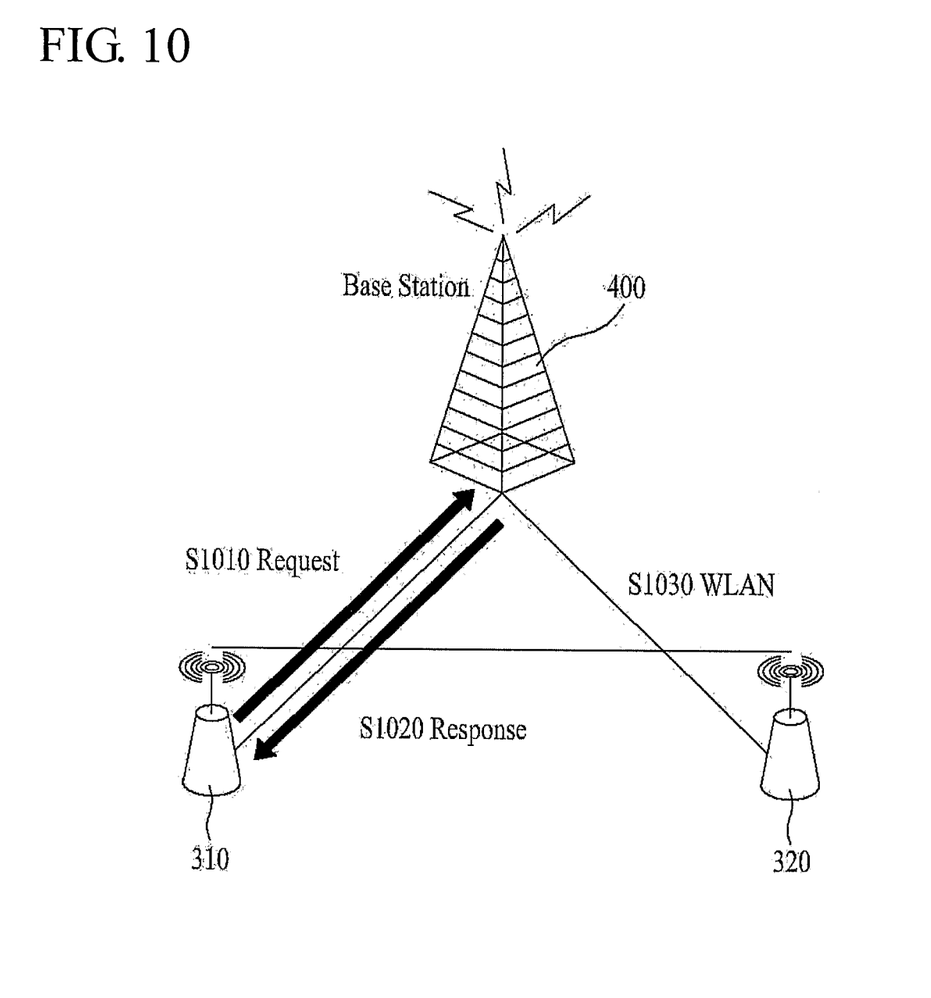
FIG. 10 illustrates a method for detecting a helping RS through a BS in an RS according to an exemplary embodiment of the present invention.

FIG. 10 illustrates a method for detecting a helping RS through a BS in an RS according to an exemplary embodiment of the present invention.

Referring to FIG. 10, when the RS 310 needs a helping RS, it requests information about a helping RS to the BS 400 in step S1010. The BS 400 may designate a most helpful RS 320 as the helping RS for the RS 310 using relay load information that the BS 400 preserves in step S1020. In step S1030, the RS 310 establishes a WLAN path with the RS 320.

In the exemplary embodiment of the present invention, since the BS has accurate knowledge of the load status of each RS, it may designate an appropriate helping RS for each RS. Compared to the exemplary embodiment of the present invention illustrated in FIG. 9, there is no need for broadcasting a control message such as a beacon message. However, the BS should acquire and preserve information about the load status of each RS and the RS may not reflect a current WLAN channel status all the time.

Figure 11:
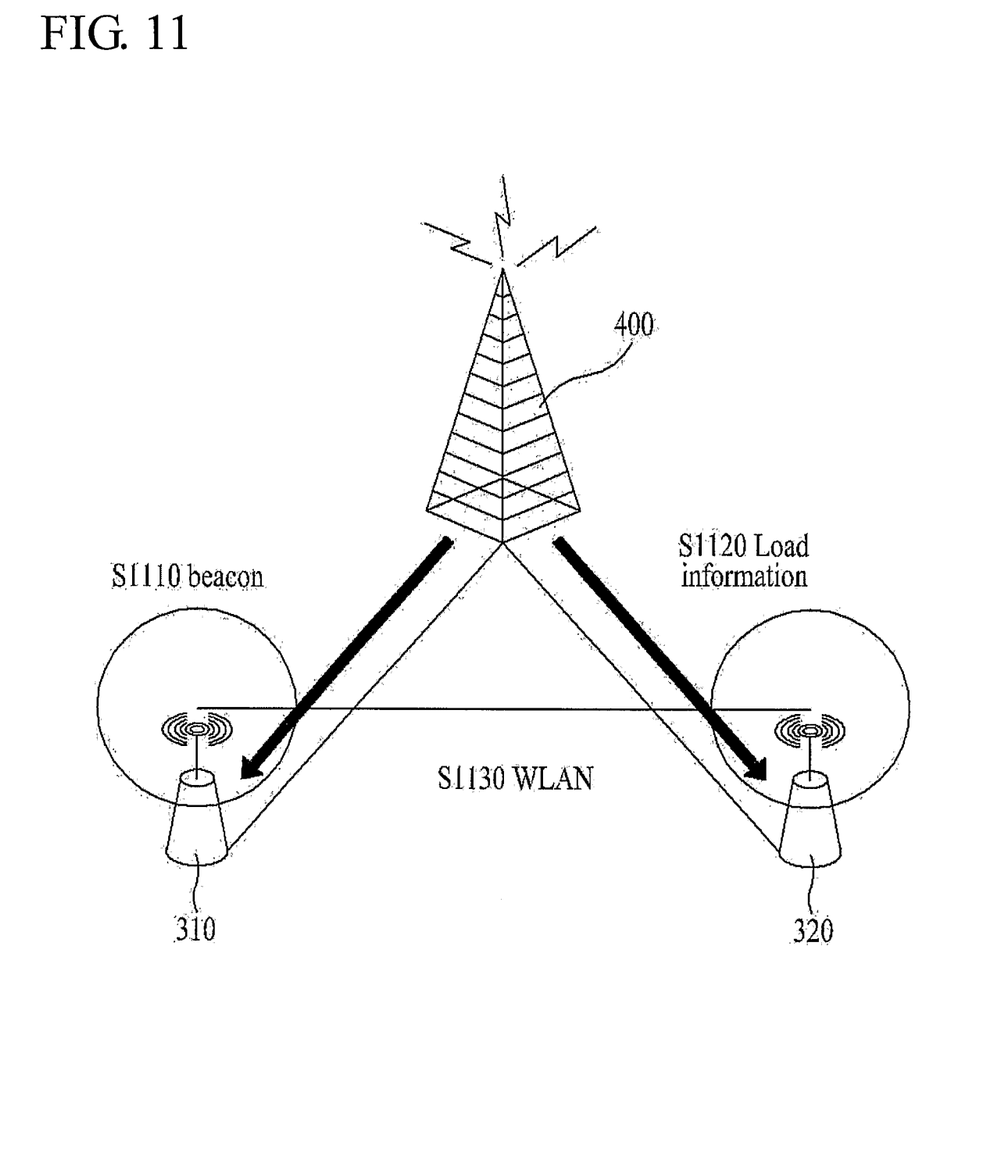
FIG. 11 illustrates a method for detecting a helping RS in an RS according to an exemplary embodiment of the present invention.

FIG. 11 illustrates a method for detecting a helping RS in an RS according to an exemplary embodiment of the present invention.

The exemplary embodiment of the present invention illustrated in FIG. 11 is a combination of the exemplary embodiments illustrated in FIGS. 9 and 10. Referring to FIG. 11, information about what RSs are around is known and preserved by exchanging beacon messages with RSs periodically in step S1110. Therefore, information about WLAN channels between each RS and particular RSs and existence of each RS are known periodically. In step S1120, the BS 400 periodically transmits load information about all RSs to each RS.

If the RS 310 searches for a WLAN path, it selects an RS that is not experiencing traffic congestion based on the load information about each RS received from the BS 400 and establishes a WLAN path with the selected RS in step S1130. Preferably, the RS 310 selects the RS 320 in good channel status from among neighbor RSs. That is, an RS may select an optimal helper, taking into account the load status of the helping RS and all WLAN channel statuses from the RS to the helping RS.

In accordance with the above-described exemplary embodiment of the present invention, cellular RSs are equipped with WLAN interface cards and when a specific RS is experiencing traffic congestion, traffic is distributed to another helping RS by WLAN communications. Therefore, load balancing is achieved. If traffic from users is distinguished according to the characteristics of the traffic and transmitted separately through a direct wired path to a BS and through a WLAN path to a neighbor RS, the delay or jitter QoS requirements of the user traffic may be satisfied better than in existing systems.

Figure 12:
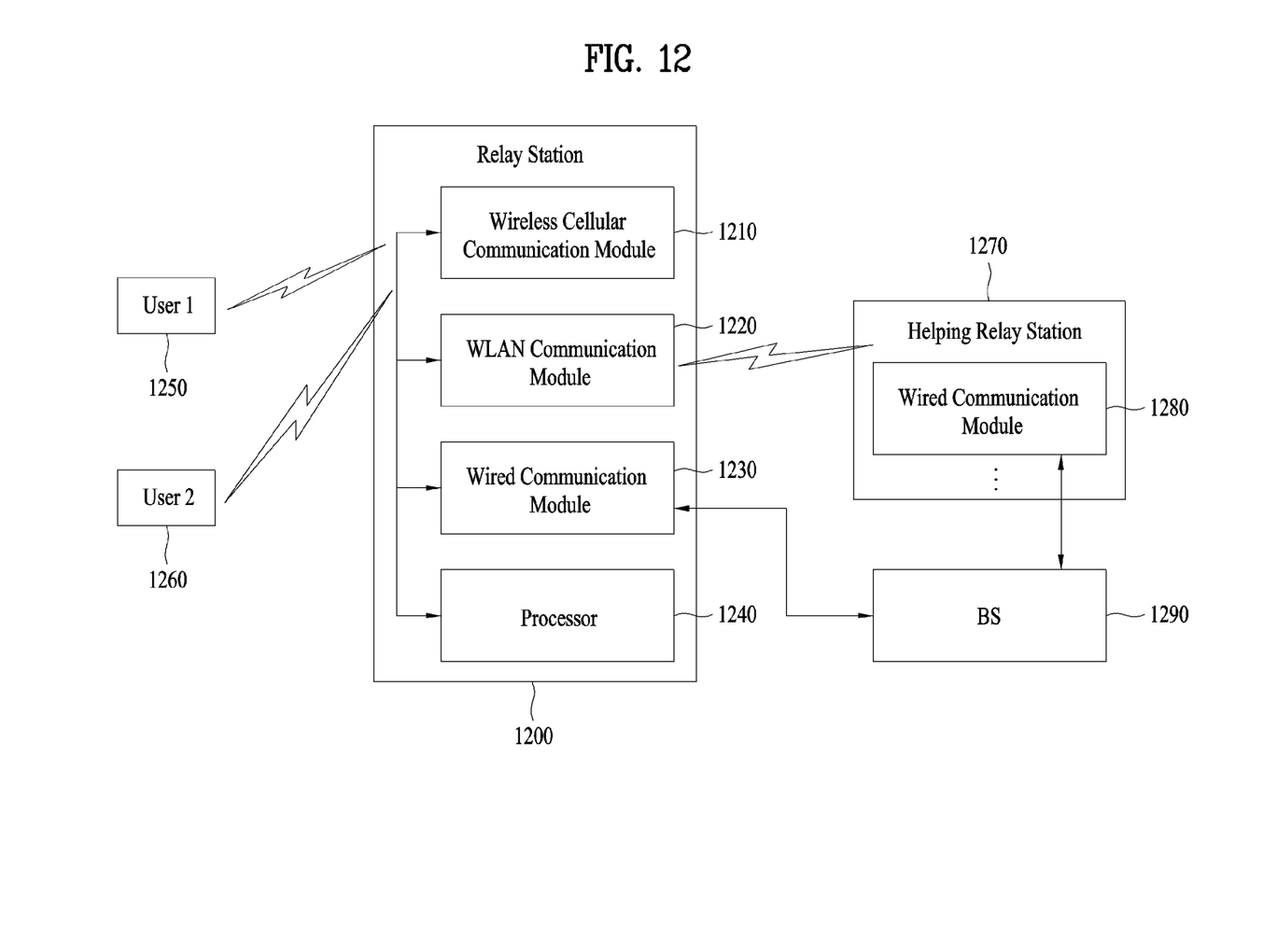
FIG. 12 is a block diagram of an RS according to an exemplary embodiment of the present invention.

FIG. 12 is a block diagram of an RS according to an exemplary embodiment of the present invention.

Referring to FIG. 12, an RS 1200 according to the exemplary embodiment of the present invention includes a wireless cellular communication module 1210 for receiving traffic from one or more users by cellular communications, a WLAN communication module 1220 for establishing a WLAN path with another RS 1270 and transmitting the received traffic to the RS 1270 through the WLAN path, a wired communication module 1230 for communicating with a BS 1290 via a wired connection, and a processor 1240 for controlling the communication modules 1210, 1220 and 1230.

In accordance with the exemplary embodiment of the present invention, the processor 1240 measures the congestion level of the traffic that the wireless cellular communication module 1210 has received from the users 1250 and 1260. If the congestion level is a predetermined value or higher, the processor 1240 transmits part of the received traffic, preferably relatively delay-tolerant traffic to the RS 1270 as a helping RS through the WLAN communication module 1220 so that the helping RS 1270 transmits the received traffic to the BS 1290 through its wired communication module 1280. The processor 1240 also controls traffic other than the traffic transmitted to the helping RS 1270 to be transmitted to the BS 1290 through the wired communication module 1230.

While the above exemplary embodiments of the present invention have been described in the context of an intermediate access point being an RS between a BS and a terminal, the intermediate access point may be any other type such as a femto cell, a pico cell, etc.

MODE FOR INVENTION

Various embodiments have been described in the best mode for carrying out the invention

INDUSTRIAL APPLICABILITY

The traffic processing methods according to the above-described exemplary embodiments of the present invention are applicable to a variety of communication systems using RSs or their equivalent intermediate access points, such as 3GPP LTE, 3GPP LTE-A, systems based on the family of IEEE 802 standards, etc.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The invention claimed is:

1. A method for processing traffic destined for a Base Station (BS) received from one or more terminals in an intermediate access point supporting two or more communication schemes, the method comprising:
   receiving traffic from the one or more terminals according to a first communication scheme;
   measuring a congestion level of the received traffic;

selecting a first part and a second part among the received traffic as a first traffic and a second traffic, respectively, the first part having a delay sensitivity below a predetermined value and the second part having a delay sensitivity equal to or higher than the predetermined value, if the congestion level is a predetermined threshold or higher;

transmitting the first traffic to a second intermediate access point according to a second communication scheme, if the congestion level is a predetermined threshold or higher; and transmitting the second traffic being remaining traffic of the received traffic to the BS.

2. The method according to claim 1, wherein the first and second communication schemes are independent of each other.

3. The method according to claim 1, wherein the first communication scheme is a cellular communication scheme and the second communication scheme is a Wireless Local Area Network (WLAN) communication scheme.

4. The method according to claim 1, wherein each of the intermediate access points includes a Relay Station (RS) and the second traffic transmission comprises 5 transmitting the second traffic over a wired network connected between the RS and the BS.

5. The method according to claim 1, wherein each of the intermediate access points includes a femto BS and a pico BS.

6. The method according to claim 1, wherein the congestion level measurement comprises determining the congestion level of the received traffic based on a queue length of a link between the BS and the intermediate access point.

7. An intermediate access point apparatus supporting two or more communication schemes, comprising:

a first communication device configured to receive traffic from one or more terminals according to a first communication scheme;

a second communication device configured to transmit traffic to a second intermediate access point apparatus according to a second communication scheme;

a third communication device configured to transmit traffic to a Base Station (BS) according to a third communication scheme; and a processor configured to measure a congestion level of the traffic received at the first communication device, and if the congestion level is a predetermined threshold or higher, control a first traffic being part of the traffic received at the first communication device to be transmitted to the second intermediate access point through the second communication device and a second traffic being remaining traffic of the traffic received at the first communication device except the first traffic to be transmitted to the BS through the third communication device, wherein the first traffic is traffic having a delay sensitivity below a predetermined value among the traffic received from the one or more terminals and the second traffic is traffic having a delay sensitivity equal to or higher than the predetermined value among the traffic received from the one or more terminals.

8. The intermediate access point apparatus according to claim 7, wherein the first and second communication schemes are independent of each other.

9. The intermediate access point apparatus according to claim 7, wherein the first communication device is a cellular communication device and the second communication device is a Wireless Local Area Network (WLAN) communication device.

10. The intermediate access point apparatus according to claim 7, wherein each of the intermediate access point apparatuses includes a Relay Station (RS) and the third communication device is a wired communication device using a wired network connected between the RS and the BS.

11. The intermediate access point apparatus according to claim 7, wherein each of the intermediate access point apparatuses includes a femto BS and a pico BS.

12. The intermediate access point apparatus according to claim 7, wherein the processor determines the congestion level of the received traffic based on a queue length of a link between the BS and the intermediate access point apparatus.

* * * * *